United States Patent [19]

Haas

[11] Patent Number: 5,085,034

[45] Date of Patent: Feb. 4, 1992

[54] METHOD OF PREPARING A BLOW MOLDED MAPLE SYRUP JUG

[75] Inventor: Richard G. Haas, South Deerfield, Mass.

[73] Assignee: Hillside Plastics Inc., Sunderland, Mass.

[21] Appl. No.: 601,228

[22] Filed: Oct. 22, 1990

[51] Int. Cl.$^5$ .......................... B29C 45/00; B05D 3/02
[52] U.S. Cl. ...................................... 53/452; 264/512; 427/377; 427/393.5; 428/36.6
[58] Field of Search ............... 427/377, 393.5; 264/80, 264/512; 428/36.6; 53/452

[56] References Cited

U.S. PATENT DOCUMENTS 4,478,889  10/1984  Maruhashi et al. ................. 427/230
4,515,836  5/1985  Cobbs, Jr. et al. ................... 427/425

*Primary Examiner*—James J. Seidleck
*Attorney, Agent, or Firm*—Richard P. Crowley

[57] ABSTRACT

A high density, blow molded container for maple syrup having a thin, oxygen-barrier coating layer of polyvinylidene chloride copolymer bonded to the exterior surface. A method of providing an extended shelf life maple syrup jug which comprises applying, such as by dipping, a polyvinylidene chloride copolymer coating layer onto the treated exterior surface of a high density polyethylene maple syrup jug.

9 Claims, No Drawings

METHOD OF PREPARING A BLOW MOLDED MAPLE SYRUP JUG

BACKGROUND OF THE INVENTION

Maple syrup is a food product derived from the sap of a maple tree, usually taken by tap from the maple tree in the spring of the year, and then boiled to a selected density of 66.5° Brix and packed and sold. Typically, the color and flavor of the maple syrup are primary factors in determining the quality, grade and price of the maple syrup. Male syrup is generally packaged and sold in either glass or tin containers, or in blow molded plastic containers which comprise high density polyethylene (HDPE). Only HDPE is presently in use as a maple syrupm container material. Typically, such plastic containers are blow molded for example at temperatures of about 300° F. to 400° F., cooled and then typically imprinted or silk screened with a design or indicia and then filled with the maple syrup.

It is desirable to package maple syrup in containers to provide for a long shelf life, since maple syrup at high temperatures and subject to oxygen tends to darken in color which alters the quality and grade of the maple syrup and is not as aethestically desirable to consumers.

It is therefore desirable to provide for a plastic, blow molded container, such as maple syrup jugs, which permit an extended shelf life for the maple syrup, and to provide an easy and effective method of manufacturing such plastic containers.

SUMMARY OF THE INVENTION

The invention relates to a blow molded plastic container, particularly for maple syrup, and to a method of manufacturing and use of such plastic, blow molded containers which provide for an extended shelf life for the maple syrup.

The present invention is directed to a blow molded plastic container adapted particularly for use in packaging a maple syrup or other food product subject to change on exposure to oxygen, that is, a maple syrup jug, and which container comprises a blow molded, particularly composed of a high density polyethylene, having a thin, oxygen-barrier coating layer bonded to a surface of the container. The coating layer consisting essentially of a polyvinylidene chloride copolymer, particularly a transparent polyvinylidene chloride copolymer to provide for an unexpected, improved and extended shelf life for maple syrup and other products packaged in the coated, blow molded container.

In addition, it has been found that the employment of a thin, transparent, crystallized coating layer of the polyvinylidene chloride particularly from a polyvinylidene emulsion, provides a protective coating layer over the silk screen or printed indicia and designs on the exterior surface of the blow molded, plastic container. Maple syrup jugs prepared by blow molding of a high density polyethylene are particularly susceptible to having the maple syrup contained therein darken in color with time due to the permeation of oxygen through the high density polyethylene, that is, have short shelf life in comparison to maple syrup packaged in glass containers. It is therefore desirable to provide an effective, easily applied, FDA approved oxygen-barrier coating to the exterior or interior surface, or both surfaces, of the blow molded, high density polyethylene jug so as to provide an extended shelf life for maple syrup packaged and stored in the jugs.

The invention also concerns a method of manufacturing and using an extended shelf life, blow molded, plastic container particularly adapted for the storage of maple syrup and other products subject to color change or based on the passage of oxygen into the container, and which method comprises blow molding a polymer into a container shape, such as jug design, and particularly employing a high density polyethylene polymer, such as for example, blow molding from a die at a temperature of 350° F. to 400° F. the HDPE polymer. The method includes then also treating the surface of the plastic, blow molded container to which one or more coating layers are to be applied, particularly the exterior surface, to effect treatment of the surface to be coated prior to the application of the coating. Surface treatment may be the employment of an open flame upon the exterior surface of the blow molded bottle to oxidize the surface or to chemically or electrically treat, for example, through the use of chemical solutions or a corona discharge, the exterior surface so as to alter, e.g. to oxidize, the chemistry of the surface and roughen the surface sufficiently to provide a secure bond of the thin coating to be applied to the surface of the plastic, blow molded container. The method includes applying one or more thin, oxygen-barrier coating layers of a polyvinylidene halide copolymer, such as polyvinylidene chloride, particularly from an aqueous latex emulsion of the polyvinylidene chloride copolymer, onto the oxidized surface of the plastic, blow molded container to form particularly a single, thin, dense crystallized barrier coating layer on the surface.

The polyvinylidene chloride copolymer typically is applied as an emulsion or a solution, such as by: dipping the plastic blow molded container up to its neck in such liquid composition; or by spraying a liquid composition of the polyvinylidene chloride onto the exterior jug surface; or by flow coating the polyvinylidene liquid composition onto the surface of the containers, such as through a waterfall or hosing operation by passing the surface-treated jug through the waterfall or the hosing fall. After application, the jug so treated is then permitted to drip off the excess liquid polyvinylidene composition. Suitable, commercially available polyvinylidene chloride copolymer, aqueous latex emulsions include, but are not limited to: Serfene emulsion (a trademark of Morton International Company, Inc.); Viclan emulsion (a trademark of Imperial Chemical Industries plc); Saran (a trademark of Dow Chemical USA); or Haloflex (a trademark of ICI Resins U.S.).

The vinylidene chloride copolymer comprises a copolymer of vinylidene chloride and an unsaturated compound, such as a minor amount, e.g. 5% to 25%, of an acrylate monomer or acrylonitrile to provide a PVDC-acrylate or PVDC-acrylonitrile copolymer which is dispersed in a water-based latex emulsion. The latex emulsion includes a dispersant surfactant, such as a non-ionic surfactant, such as glycol and ether components and additives, typically used in polymeric latex emulsions. The latex emulsion of the copolymer generally has a low pH, e.g. 1.8 to 4.0, is water bsed, has 45% to 60% by weight of solids and a viscosity of 30 to 100 cps at 25° C. The amount of acrylate or acrylonitrile monomer in the copolymer may vary, but should be sufficient to permit a controlled drying of the copolymer emulsion into a dense crystallized and not granulated coating layer. The acrylate monomer may for example be an acrylic or methoacrylic acid or alkyl, e.g. methyl or ethyl ester of the acid, or an amino or hydroxy derivative, such as a 2-hydroxy ethyl acrylate or a hydroxy propyl acrylate or mixture or combinations thereof to provide a PVDC-acrylate copolymer which acts as an oxygen-barrier coating.

The method includes drying the applied thin, liquid coating layer of the polyvinylidene chloride on the jug surface, typically at high temperatures, for example, between 80° F. and 265° F. and generally at high humidity, for example, having greater than about 50% relative humidity, under drying conditions so as to form a clear, continuous, transparent polyvinylidene chloride film which is securely bonded to the oxidized surface of the plastic, blow molded container.

Typically, the drying operation includes drying at about 2 to 5 minutes at a temperature of about from 45° F. to 80° F. under humidity conditions to prevent the rapid drying out and granulation of the polyvinylidene chloride copolymer at the beginning of the drying process. Thereafter, the drying process is extended, for example for 10 to 30 minutes or longer, to provide a continuous, transparent, oxygen-barrier thin coating. At the beginning of the drying process, it is desirable to provide for relatively high humidity and controlled temperature conditions to prevent the cooling and granulation of the polyvinylidene chloride polymer through the rapid cooling of the surface through the evaporation of the water of the emulsion. After drying of the polyvinylidene chloride polymer coating layer, the jugs then may be filled with the food product, particularly maple syrup, capped and then sold. Such maple syrup-filled plastic containers with the oxygen-barrier of the polyvinylidene chloride polymer which is FDA approved provide for unexpectedly long, extended shelf life which compares favorably with storage of maple syrup in glass containers.

Optionally, and particularly desirable, is that the blow molded plastic containers should be imprinted, such as y silk screening with the desired design or printed indicia prior to application of the coating layer so that he coating layer on drying also provides a protective, shiny coating layer for the printed indicia on the plastic, blow molded container. Testing of the polyvinylidene chloride-coated, high density polyethylene, blow molded maple syrup jugs has shown a significant and inexpensive enhancement in shelf life duration comparable with the storage of maple syrup in glass containers.

Generally, the coating layer of the polyvinylidene chloride should be a continuous, and optionally, a transparent coating layer or layers applied from a liquid composition of the polyvinylidene chloride, and the coating thickness may range from about 0.2 to 3.0 or more mils and typically, may be applied and preferably in a single coating step as a single, dense crystallized, copolymer layer. If desired, the coating may be applied in a number of different steps to ensure continuity and complete oxygen-barrier sealing of the surface of the high density polyethylene plastic container.

The invention will be described for the purposes of illustration only in connection with certain preferred embodiments; however, it is recognized by those persons skilled in the art that various modifications, changes, improvements and additions may be made to the illustrated embodiments without departing from the spirit and scope of the invention.

DESCRIPTION OF THE EMBODIMENTS

A number of maple sugar jugs (one pint) with screw-on threads about the opening were blow molded at 350° F. to 400° F. from high density polyethylene resin and the exterior surface treated with an open flame to oxidize the surface up to the screw threads of the opening. A label design and printed indicia were silk screened onto the exterior surface. The treated jugs were then dipped into an emulsion of polyvinylidene chloride copolymer (Serfene 121) up to the threads on the jug neck, then hung up to dry at a relative humidity of 50% to 60% and at about a temperature of 65° F. to 75° F. for 20 to 30 minutes to form a transparent, dense, crystallized, shiny, continuous coating layer of polyvinylidene chloride on the exterior surface of the jug.

The treated and single layer coated jugs were then filled with a maple syrup and marked XL, while the same maple syrup was filled into a glass container (glass) and an untreated, uncoated HDPE jug of the same design (untreated). The darkness of the maple syrup was then monitored by taking aliquot samples from each container over a period of time with all containers stored at the same temperature of 73° F. The darkness of the maple syrup is a measure of the shelf duration and oxygenation of the maple syrup in the container. The measurement of the maple syrup samples was done with a spectrophotometer (560 nm 10mm optical cell). The test results of the oxygen transmission rate for the containers are shown in the table below.

TABLE

| CONTAINER | SHELF DURATION | | | | |
|---|---|---|---|---|---|
| | 0 days | 30 days | 60 days | 90 days | 140 days |
| Glass | 65 | 64.2 | 61.9 | 61.2 | 62.0 |
| XL | 65 | 62.8 | 60.9 | 61.3 | 62.4 |
| Untreated | 65 | 57 | 50.2 | 49.9 | 49.6 |

These test results show that the treated, PVDC-coated XL maple syrup jug provided the same protection as glass containers, while the untreated and uncoated jugs showed a shorter shelf life and considerable darkening of the maple syrup within 90 days.

What is claimed is:

1. A method of manufacturing an extended life, blow molded, plastic container, particularly adapted for use for the storage of maple syrup, which method comprises:
    a) blow molding a plastic container employing a high density polyethylene polymer;
    b) treating the surface of the blow molded, high density polyethylene, plastic container to alter the surface thereof;
    c) applying a thin, oxygen-barrier coating layer of an aqueous liquid latex composition consisting essentially of crystallizable polyvinylidene chloride-acrylate copolymer onto the treated surface of the plastic container;
    d) drying the coating layer at a temperature of less that 100° F. and initially at a relative humidity of greater than about 50% to prevent rapid drying and the granulation of the coating layer at the beginning of the drying step to provide a dense, crystallized, continuous, oxygen-barrier, bonded coating layer; and
    e) recovering the coated plastic container for use.

2. The method of claim 1 which includes applying said oxygen-barrier coating layer by dipping the blow molded, plastic container into said liquid emulsion.

3. The method of claim 1 which includes flame treating the exterior surface of the blow molded, plastic container to oxidize the surface prior to applying said oxygen-barrier coating layer.

4. The method of claim 1 which includes printing indicia on the exterior surface of the plastic container and thereafter applying said oxygen-barrier coating layer on the exterior surface.

5. The method of claim 1 which includes filling the coated, dried container with maple syrup.

6. The method of claim 1 which includes drying the coating layer initially for about 2 to 5 minutes at a temperature of from about 45° to 80° F. and thereafter extending the drying time for greater than 10 minutes.

7. The method of claim 1 which includes drying the coating layer at a relative humidity of 50% to 60% at a temperature of 65° to 75° F. for 20 to 30 minutes.

8. The method of claim 1 which includes applying the coating layer of the latex composition by flow coating the latex composition onto the surface of the plastic container.

9. The method of claim 1 which includes blow molding the plastic container at a temperature of 350° to 400° F.

* * * * *